United States Patent [19]

Ohki et al.

[11] Patent Number: 4,924,311
[45] Date of Patent: May 8, 1990

[54] DUAL-MODE TELECONFERENCING SYSTEM

[75] Inventors: Jun'ichi Ohki; Toshio Koga, both of Tokyo, Japan

[73] Assignee: NEC Corporation, Tokyo, Japan

[21] Appl. No.: 339,441

[22] Filed: Apr. 17, 1989

[30] Foreign Application Priority Data

Apr. 15, 1988 [JP] Japan .................................. 63-93036
Mar. 31, 1989 [JP] Japan .................................. 1-78564
Mar. 31, 1989 [JP] Japan .................................. 1-78566

[51] Int. Cl.$^5$ .......................... H04N 7/12; H04N 7/14
[52] U.S. Cl. ................................... 358/138; 358/133; 358/135; 358/85; 379/53
[58] Field of Search ............... 358/133, 138, 134, 135, 358/85; 379/53

[56] References Cited

U.S. PATENT DOCUMENTS

| | | | |
|---|---|---|---|
| 4,533,943 | 8/1985 | Poirier | 358/85 |
| 4,654,484 | 3/1987 | Reiffel | 358/133 |
| 4,654,866 | 3/1987 | Böttle | 358/85 |
| 4,703,348 | 10/1987 | Yuasa | 358/135 |

*Primary Examiner*—Howard W. Britton
*Attorney, Agent, or Firm*—Sughrue, Mion, Zinn, Macpeak & Seas

[57] ABSTRACT

In a teleconferencing system, a video encoder at the transmit end of the system includes a frame memory for storing video samples of a frame of a motion-picture signal and reading video samples at frame intervals. For still-picture transmission, an encoder circuit translates video samples read out of each successively shifted location of the frame memory which corresponds to at least one scanning line period of the frame into a signal representative of an intraframe correlation between adjacent video samples and generates a signal of a constant value during remaining line periods of the frame. For motion-picture transmission, video samples of the motion-picture signal for at least one scanning line period are translated into a signal representative of the intraframe correlation and video samples of remaining line periods of each successive frame are translated into a signal representative of the interframe correlation between successive frames. A video decoder at the receive end recovers a video sample from successively received intraframe correlation representative signals, delays it for a frame period to recover a video sample from the delayed sample together with a subsequently received signal which is the constant value signal during the still-picture mode and which is the interframe correlation representative signal during the motion-picture mode. The decoder further delays the last-mentioned video sample for a frame period to repeat the recovery process.

23 Claims, 12 Drawing Sheets

DUAL-MODE TELECONFERENCING SYSTEM

BACKGROUND OF THE INVENTION

The present invention relates generally to teleconferencing systems, and more particularly to a dual-mode teleconferencing system.

With conventional teleconferencing systems, motion-picture signals can only be transmitted from a motion-picture video encoder and received only by a motion-picture video decoder. Likewise, still-picture signals can only be transmitted from a still-picture video encoder and received only by a still-picture video decoder. The incompatibility between motion-picture and still-picture transmissions arises from the differences in coding techniques employed in the motion-picture and still-picture video encoders.

SUMMARY OF THE INVENTION

It is therefore an object of the present invention to provide a teleconferencing system which eliminates the incompatibility problem by allowing still-picture signals and motion-picture signals to be transmitted either from still-picture and dual-mode video encoders and received by dual-mode video decoders.

According to a first aspect of the present invention, there is provided a still-picture video encoder for a teleconferencing system. This encoder comprises a frame memory and a control circuit that controls write-in and readout of the frame memory by writing video samples of a frame of a motion-picture signal into the memory and reading stored video samples from the memory at frame intervals. An encoder circuit is provided for encoding video samples read out of a location of the frame memory which corresponds to at least one scanning line period of the frame into a signal representative of an intraframe correlation between adjacent ones of the video samples and generating a signal of a constant value during remaining line periods of the frame. The location of the frame memory from which video samples are read out is successively shifted by at least one scanning line at frame intervals until all the video samples are encoded using the correlation between successive video samples.

According to a second aspect of the present invention, a dual-mode video encoder is provided which comprises a frame memory, an encoder circuit, and a control circuit. The control circuit writes samples of a frame of a motion-picture signal into the frame memory and reads the stored video samples at frame intervals from the frame memory during a still-picture mode. During a motion-picture mode, the control circuit supplies the motion-picture signal to the encoder circuit. During the still-picture mode, video samples are read out of a location of the memory corresponding to at least one scanning line period of the frame and translated into a signal representative of an intraframe correlation between adjacent video samples and a signal of a constant value is generated for remaining line periods of the frame. During the motion-picture, mode, the encoder circuit translates video samples of the motion-picture signal for at least one scanning line period into a signal representative of the intraframe correlation and translates video samples of the motion-picture signal of remaining line periods of each successive frame into a signal representative of an interframe correlation between successive frames. The location of the frame memory from which video samples are read is successively shifted by at least one scanning line at frame intervals during the still-picture mode, and the scanning line whose video samples are encoded is successively shifted at frame intervals during the motion-picture mode.

According to a third aspect of the invention, a dual-mode video decoder is provided for receiving a data bit stream either from the still-picture or dual-mode video encoder. The data bit stream contains a first code identifying a signal representative of an intraframe correlation between successive video samples during either of motion-picture and still-picture modes and a second code identifying a signal representative of an interframe correlation between successive frames during the motion-picture mode or identifying a signal having a constant value during the still-picture mode. A first delay loop is responsive to a detection of the first code for successively causing an adder to provide summation of successive ones of the intraframe correlation representative signal. A second delay loop is operable during the motion-picture mode for delaying an output signal from the first delay loop and the interframe correlation representative signal for a period of the frame and is responsive to a detection of the second code for causing the adder to provide summation of the delayed signals with the interframe correlation representative signal of a subsequent arrival, and further delaying the last-mentioned summed signals for a period of the frame to repeatedly cause the adder to provide summation of the further delayed signals with the interframe correlation representative signal of a later arrival. During the still-picture mode, the second delay loop delays an output signal from the first delay loop and the constant value signal of first arrival received from the video encoder for a period of the frame and is responsive to a detection of the second code for causing the adder to provide summation of the delayed signals with the constant value signal of a subsequent arrival. The second delay loop further delays the last-mentioned summed signals for a period of the frame to repeatedly cause the adder to provide summation of the further delayed signals with the constant value signal of a later arrival.

BRIEF DESCRIPTION OF THE DRAWINGS

The present invention will be described in further detail with reference to the accompanying drawings, in which.

DETAILED DESCRIPTION

Figure 1:
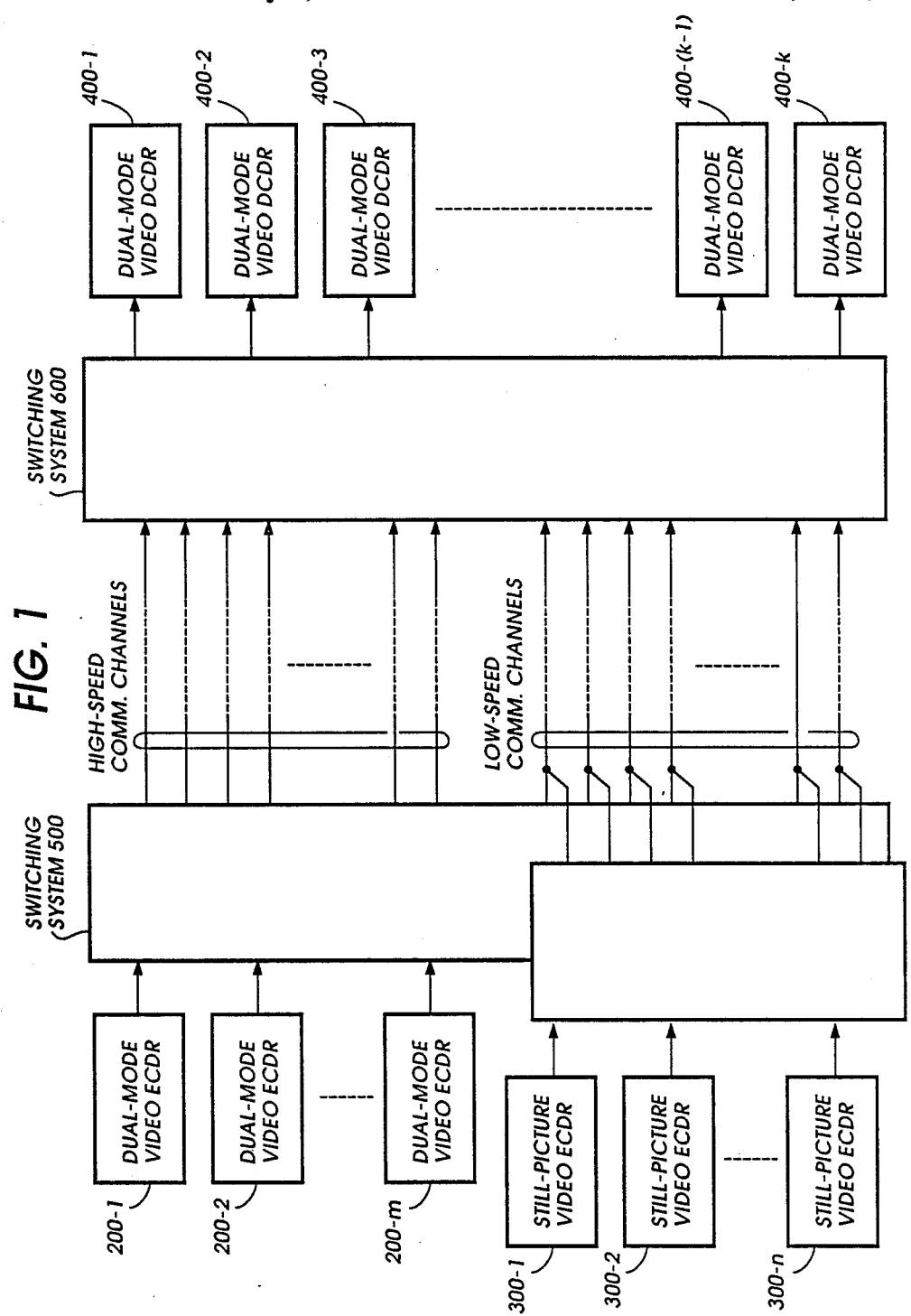
FIG. 1 is a block diagram of a teleconferencing system according to the present invention.

Referring now to FIG. 1, there is shown a teleconferencing system according to the present invention. The system comprises a plurality of dual-mode (motion-picture and still-picture modes) video encoders 200-1 to 200-m and a plurality of still-picture video encoders 300-1 to 300-n at the transmit end of the system and a plurality of dual-mode video decoders 400-1 to 400-k at the receive end. The encoders 200 and 300 are connected to line terminals of a public or private telephone switching system 500 and decoders 400 are connected to line terminals of a telephone switching system 600. The outgoing trunk terminals of the switching system 500 are connected by a plurality of high-speed communication channels and low-speed communication channels to corresponding incoming trunk terminals of the switching system 600. Dual-mode encoders 200-1 to 200-m are accessable through the high-speed communication channels to any of the dual-mode video decoders 400-1 to 400-k during a motion-picture mode or by way of the low-speed communication channels to any of the dual-mode video decoders during a still-picture mode. Still-picture video encoders 300-1 to 300-n are, on the other hand, accessable only through the low-speed communication channels to any of the dual-mode video decoders 400.

Figure 2:
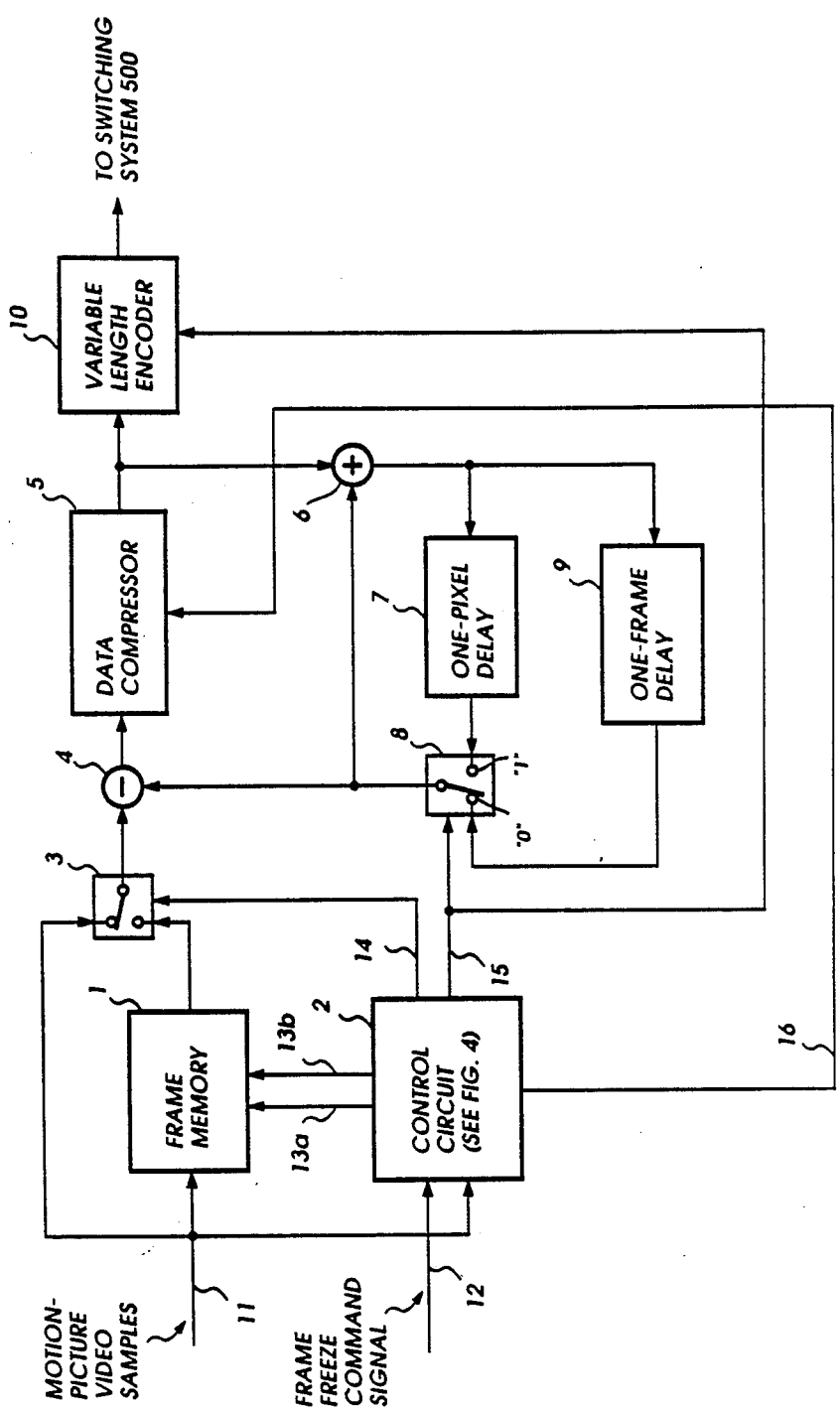
FIG. 2 is a block diagram of a first form of the dual-mode video encoder of the present invention.

Referring to FIG. 2, each of the dual mode video encoders 200 is provided with a frame memory 1 to store a single frame of motion-picture digital video samples supplied through an input line 11 in response to a write enable pulse supplied through line 13a from a control circuit 2 and repeatedly read out the stored frame from the memory 1 for transmission of still-picture signals. During a still-picture mode, control circuit 2 receives a freeze frame command signal, or logic-1 pulse through an input line 12 to operate a switch 3 through control line 14 so that it couples the output of frame memory 1 to a subtractor 4. During motion-picture modes, the control line 14 is at logic 0 and control circuit 2 operates the switch 3 to connect the input line 11 to the subtractor 4. In either mode of operation, the output of subtractor 4 is a differential signal representative of a difference in digital value between an input video sample and a video sample from a switch 8.

Switch 8 has a "1" position terminal which is connected to the output of a one-pixel delay circuit 7 and a "0" position which is connected to the output of one-frame delay 9. In response to a logic-1 input on control line 15 from control circuit 2, the output of switch 8 is connected to the "1" position terminal and in response to a logic-0 input on line 15 it is switched to the "0" position terminal.

A data compressor 5 is connected to the output of subtractor 4 to compress the quantization range of each differential video sample to the range of value it assumes. If the original video sample is an 8-bit word, the 256 quantum steps of the output of subtractor 4 are converted to 64 steps, for example, which can be represented by a 6bit word. With this data compression process, the amount of information to be transmitted can be reduced without affecting the quality of transmission. Data compressor 5 is constructed of a read-only memory which stores 6-bit data words in locations addressable as function of 8-bit higher significant address inputs supplied from the subtractor 4 in addition to a binary "0" lower significant address input which is supplied through control line 16 from the control circuit 2 when a scanning line is being "refreshed" in a manner as will be described during either mode of operation. The ROM 5 also stores a binary "0" which is recalled as "invalid" data instead of stored data, regardless of the contents of the differential output signal from subtractor 4, when the control line 16 is at logic 1. Control circuit 2 generates this logic 1 pulse when signals in the area of still-picture frame other than the "refreshed" line is being read out of frame memory 1.

The output of data compressor 5 is supplied to one input of an adder 6, the output of which is coupled to the one-pixel delay 7 and one-frame delay memory 9. One-pixel delay circuit 7 delays its input by one pixel period to detect differences between successive video samples at the output of subtractor 4 utilizing the correlation between successive pixels (interpixel coding), and one-frame delay memory 9 delays its input by one frame period to detect differences between pixels spaced one-frame period apart utilizing the correlation between successive frames (interframe coding).

Adder 6 takes its another input from the outputs of delays 7 and 9 when switch 8 is in the "1" position terminal so that the sum of a differential sample from data compressor 5 and a one-pixel delayed sample from delay 7 recovers an original video sample at the output of adder 6 and is stored into the one-frame delay memory 9 when a scanning line is being "refreshed" during either mode of operation. In addition, the sum of a differential sample from compressor 5 and a one-frame delayed sample from delay memory 9 also results in the recovery of an original video sample at the output of adder 6 and is stored again into the delay memory 9 during non-refreshed periods of motion-picture mode. However, during non-refreshed periods of still-picture mode, invalid ("0") bits are stored into the delay memory 9.

The output of data compressor 5 is further applied to a variable length encoder 10 which is reponsive to a single on control line 15 from control circuit 2 to insert a code indicating whether the differential signal is an interpixel coded signal or an interframe coded signal. Encoder 10 translates the differentially coded signals according to a high-efficiency coding principle such as Huffman coding. The output signal from encoder 10 is applied to a corresponding line terminal of the switching system 500.

Figure 3A:
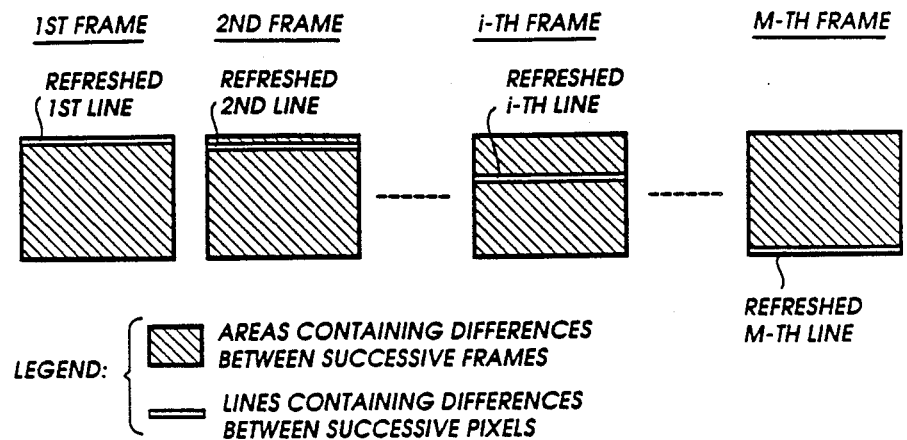
FIGS. 3A and 3B are schematic illustrations useful for describing the operations of the dual-mode video encoder of FIG. 2 during motion-picture mode and still-picture mode, respectively.

More specifically, during a motion-picture mode, control line 15 is periodically switched to logic-1 level at frame intervals to connect the switch 8 to the "1" position terminal so that, when video samples on the N-th line of the N-th motion-picture frame (which is counted from a given instant of time) are supplied through switch 3 to subtractor 4, the output of delay circuit 7 is applied to subtractor 4 as an interpixel (intraframe) prediction signal as well as to adder 6. As a result, a series of 6-bit differentially coded video samples are derived by data compressor 5 from successive video samples of the first line of the first of a series of M motion-picture frames (where M represents the number of scanning lines) and subsequently from successive video samples of the second line of the second frame, and so on. With the switch 8 being connected to the "1" position terminal, video samples on the N-th line of the N-th motion-picture frame are differentially coded and compressed in data bit quantity. This process is termed "refreshed" mode and a scanning line being created in this mode is called "refreshed". After being encoded with Huffman coding, the "refreshed" line is transmitted to the motion-picture decoder 20 and at the same time, original video samples recovered at the output of adder 6 from the "refreshed" line are stored into delay memory 9. Video samples stored in the delay memory 9 in this manner are supplied during the next frame period as in interframe prediction signal to subtractor 4 when switch 8 is connected to the "0" position terminal in order to derive differentially coded video samples from successive frames. With the switch 8 being switched to the "0" position terminal during motion-picture mode, the encoder performs interframe coding and original video samples derived at the output of adder 6 during this mode are stored into the delay memory 9. In this way, the scanning line which is refreshed is successively scrolled to the next as video signals change from one frame to the next as illustrated in FIG. 3a. During this motion-picture mode, control line 16 is held at logic 0 level to allow data compressor 5 to perform data bit compression.

During a still-picture mode, the control circuit 2 applies a write enable pulse through line 13a to frame memory 1 to store a single frame of motion-picture signal and thereafter applies a read enable pulse at periodic intervals to repeatedly read the stored frame as often as there are scan lines in the frame. Control line 15 is periodically switched to logic-1 level in response to the read timing of frame memory 1 so that, when video samples on the N-th line of the N-th readout are recalled from the frame memory 1, the output of delay circuit 7 is supplied to subtractor 4 as an interpixel prediction signal as well as to adder 6. In this way, a series of 6-bit differentially coded video samples can be derived by data compressor 5 from successive video samples of the first line of the stored frame during the first reading of memory 1 and subsequently from video samples of the second line of the stored frame during the second reading of memory 1, and so on.

Figure 3B:
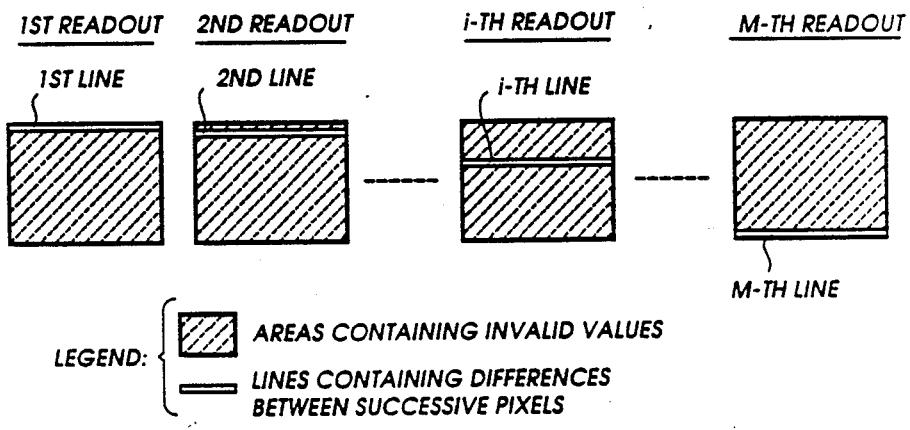
Figure 4:
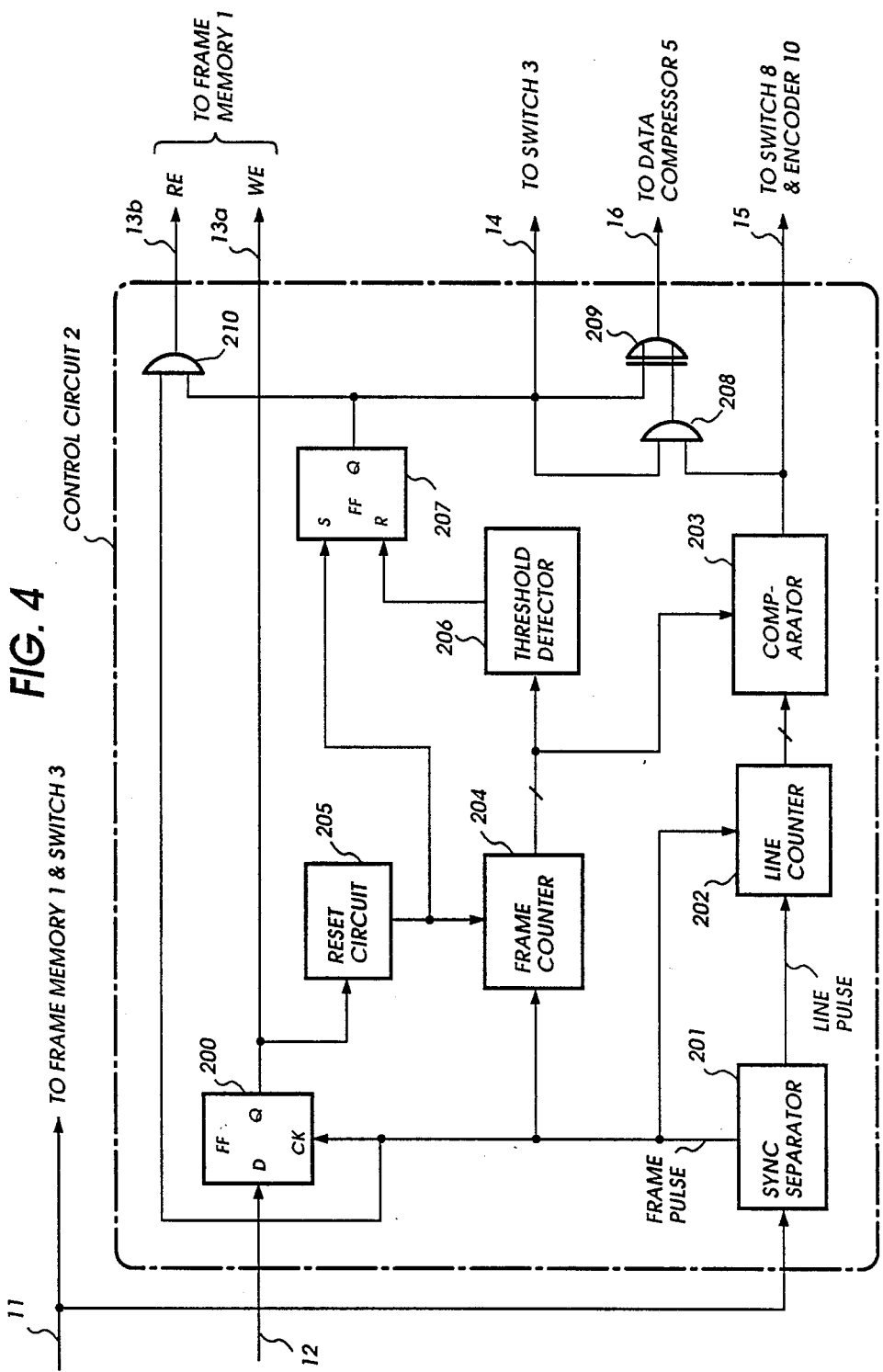
FIG. 4 is a circuit diagram of the control circuit of FIG. 2.

During the still-picture mode, control line 16 switches to logic-0 level synchronously with the logic-1 timing of control line 15 in order to allow data compressor 5 to perform data bit compression on differentially coded samples of a scanning line to be refreshed, and switches to logic 1 during the remaining line periods to cause the compressor 5 to generate a series of "0" bits, or invalid data bits for non-refreshed areas of the freeze frame picture, which is indicated by dotted lines in FIG. 3b. In this way, the refreshed line scrolls line by line as in the case of motion-picture mode.

Variable length encoder 10 converts the output of compressor 5 into Huffman codes in a manner similar to that of the motion-picture mode. Since the non-refreshed area of a freeze frame picture is converted into "0" bits, the total volume of still-picture information can be significantly reduced.

Figure 5:
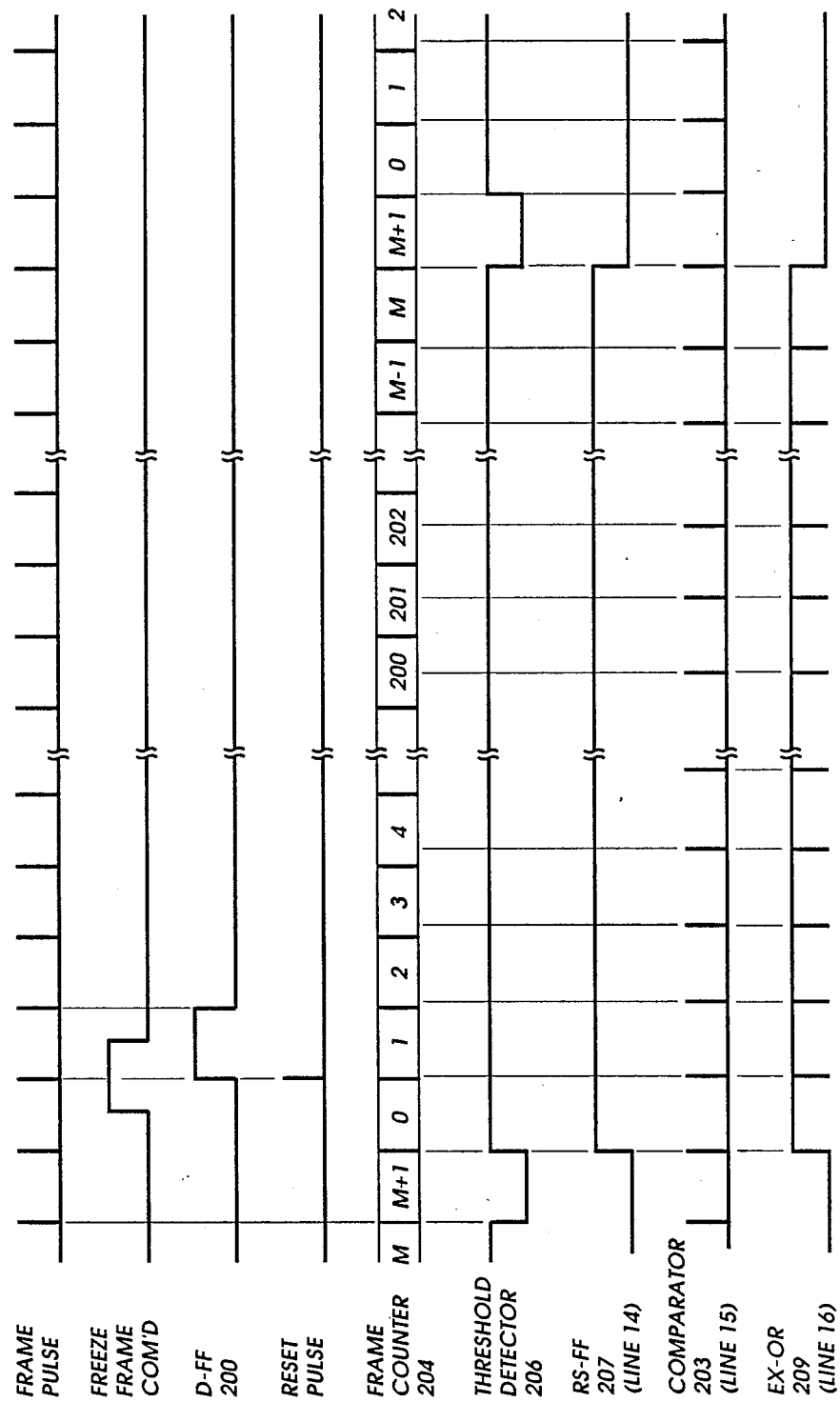
FIG. 5 is a timing diagram associated with the circuit of FIG. 4.

FIG. 3 shows details of the control circuit of FIG. 2. As shown, the control circuit 2 includes a type D flip-flop 200 having a D input port connected to the frame freeze command input line 12. A sync separator 201 receives the motion-picture video samples through input line 11 to separate vertical and horizontal sync pulses from the video components and generates frame pulses (see FIG. 5) as well as line pulses. The frame pulse is applied to the clock input of flip-flop 200 so that the freeze command signal is shaped into a pulse having exactly the duration of a frame period and applied as a write enable pulse through line 13a to the frame memory 1. The frame pulse is further applied to a frame counter 204 which is initialized by a reset circuit 205 which essentially comprises a differentiator and an inverter.

The reset pulse is further applied to the set input of an RS flip-flop 207, the output of which is coupled to an AND gate 210 to cause it to pass frame pulses through line 13b to frame memory 1 to sequentially read out the contents of memory 1 at frame intervals. The output of flip-flop 207 is further applied to control line 14 as a mode select signal indicating either motion-picture or still-picture mode.

The output of frame counter 204 indicates the count of readouts of frame memory 1 since the time of application of the frame freeze command pulse to line 12. The output of frame counter 204 is applied to a threshold detector 206, which in turn supplies a reset pulse to flip-flop 207 when the frame count reaches M+1. The line pulse from sync separator 201 is applied to a line counter 202 which is reset in response to each frame pulse to count scanning lines. The line count value and frame count value are supplied to a digital comparator 203. When the two count values are equal, comparator 203 supplies a logic-1 output to an AND gate 208 as well as to control line 15. Therefore, the output of AND gate 208 goes high at the N-th line of the N-th reading of memory 1.

The output of AND gate 208 is applied to an exclusive OR gate 209 to which the output of flip-flop 207 is also applied. Since the logic-1 output of flip-flop 207 is of a duration equal to (M+1) times the frame interval as seen from FIG. 5, the application of a logic-1 from AND gate 208 to exclusive OR gate 209 causes its output to go low at times synchronized with the read timing of each successive line from memory 1.

Figure 6:
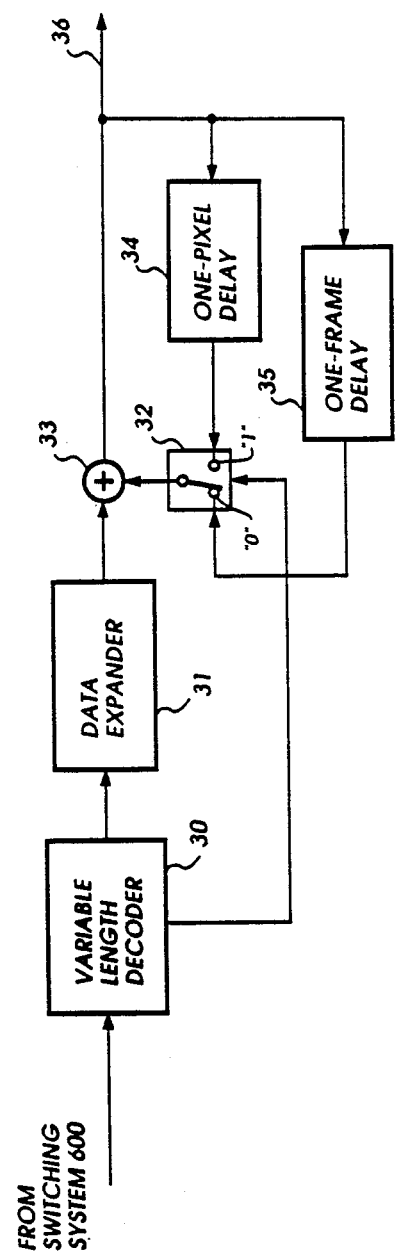
FIG. 6 is a block diagram of a first form of the dual-mode video decoder of the present invention.

As shown in FIG. 6, dual-mode video decoder 400 comprises a variable length decoder 30 which is connect to a corresponding line terminal of the switching system 600. Signals received through a low-speed communication channel are decoded by a process inverse to that of encoder 200 or 300 at the transmitter and the contents of the signals are examined and a switching signal is generated, indicating whether the received signal is an interpixel differential signal or an invalid "0" bit data. Decoder 400 applies decoded differential signals to a data expander 31 on the one hand and the switching control signal to a switch 32. Data expander 31 performs expansion of the quantization range of the differential signal to the original range by converting the 6-bit word to an 8-bit word and supplies the converted word to one input of an adder 33 whose output is coupled to a one-pixel delay circuit 34 and a one-frame delay memory 35, and further through an output line 36 to a display device, not shown, which includes a frame memory to reconstruct the original image. The output of delay circuit 34 is connected to the "1" position terminal of switch 32, the output of delay memory 35 being connected to the "0" position terminal of switch 32. In response to a logic-1 switching signal from decoder 30, the output of delay circuit 34 is applied through switch 32 to the adder 33 and in response to a logic-0 output from decoder 30, the output of delay memory 35 is coupled to the adder 33.

With a logic-1 switching signal being supplied from decoder 30, differences between successive pixels on each "refreshed" line are supplied ti adder 33 from expander 31 and successively delayed and accumulated in a feedback loop formed by delay circuit 34, switch 32 and adder 33, so that a replica of original video samples is recovered at the output of adder 33 and applied to the display device as well as to the delay memory 35. With a logic-0 input from decoder 30, invalid, "0" bit data are supplied from expander 31 to adder 33 and combined with data read out of memory 35.

Figure 7:
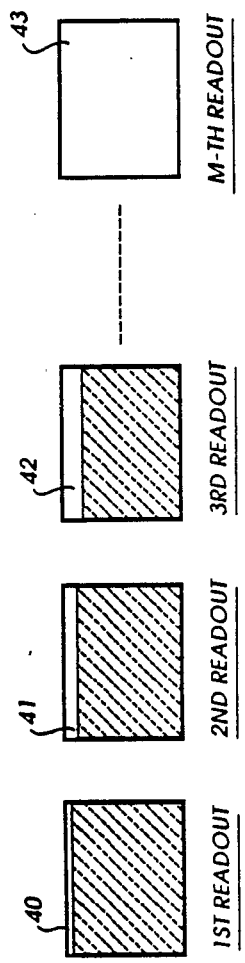
FIG. 7 is a schematic illustration useful for describing the operation of the dual-mode video decoder of FIG. 6.

Therefore, at the end of reception of signals resulting from the first reading of frame memory 1 at the transmitter, signals recovered from the first line of the freeze frame picture are stored into a first line area of the delay memory 35 as indicated by a blank retangle 40 in FIG. 7 and the invalid data resulting from the second to the M-th line of the first reading are stored in the rest of the emory 35 as indicated by dotted lines. In response to the second reading of frame memory 1 at the transmitter, the first line of the received picture contains invalid "0" bit data and the second line contains "refreshed" valid data, while the third to the M-th line contain "0" bit invalid data. Therefore, the signals in the first line area 40 of the memory 35 are summed with the invalid data of the first line of the second read cycle and fed to the display as well as to the delay memory 35. Valid signals on the second (refreshed) line of the second readout are then successively accumulated in the feedback loop of delay circuit 34 and a replica of the original signals of that second line is recovered and fed to the display as well as to the delay memory 35. The invalid data on the third to the M-th line of the second readout are successively combined with invalid data read out of delay memory 35 and applied to the display as well as memory 35.

Therefore, at the end of reception of signals resulting from the second readout, original signals of the first and second lines are successively stored in an area 41 of delay memory 35 as shown in FIG. 7.

When signals resulting from the third readout are received, the signals stored in the area 41 are read out of delay memory 35 and original signals of the first, second and third lines are recovered for delivery to the display and for storage again into an area 42. As readout operations proceed at the transmitter, recovered original signals of successive lines are stored in an increasing area of delay memory 35 and applied simultaneously to the display until the last line is reached, whereupon the full storage area of delay memory 35 is filled with original signals as shown at 43 in FIG. 7. In this way, a still-picture image can be reconstructed in the display as the refreshed line scrolls down to the bottom of a screen.

Figure 8:
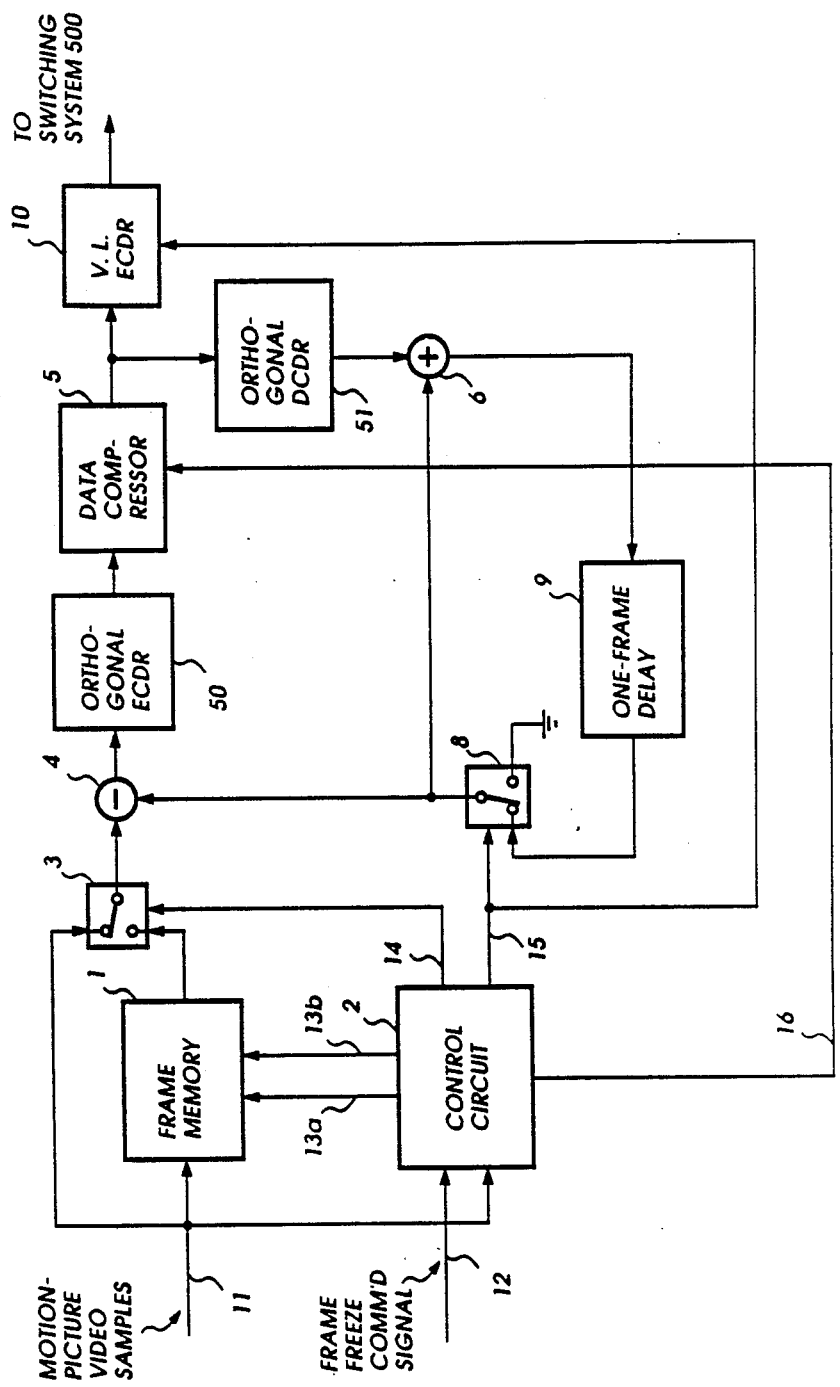
FIG. 8 is a block diagram of a second form of the dual-mode video encoder of the present invention.

Referring to FIG. 8, a modified embodiment of the dual mode encoder of FIG. 2 is illustrated. This encoder differs from the encoder of FIG. 2 in that it includes an orthogonal encoder 50 and orthogonal decoder 51 instead of the one-pixel delay circuit 7 of FIG. 2 and the "1" position terminal of switch 8 is connected to ground. Orthogonal encoder 50 is connected to the output of subtractor 4 perform orthogonal conversion on differential signals in spatial domain from subtractor 4 so that it is represented by a corresponding value in frequency domain. The output of orthogonal encoder 50 is applied to the data compressor 5 where the digit is compressed and applied to the orthogonal decoder 51 as well as to the variable length encoder 10. Orthogonal decoder 41 translates the frequency domain signal to the original spatial domain signal and applies it to the adder 6 which, in turn, recovers original video samples by summing the output of decoder 41 with a signal from the switch 8.

During a refresh mode of either motion-picture or still-picture transmission, the "1" position terminal of switch 8 is connected to ground in response to a logic-1 input on control line 15 to supply the ground potential as invalid "0" bit data to the subtractor 4. The output of subtractor 4 is a replica of its input signal from switch 3. The frequency domain signal of this replica represents the differences between successive pixels and is stored into the delay memory 9. When the control line 15 is at logic 0, the output of one-frame delay memory 9 is connected to the subtractor 4 to detect differences between successive frames. This interframe difference signal is converted to a frequency domain signal by encoder 50, compressed in data bit by compressor 5 and converted back to a spatial domain signal of interframe difference by decoder 51 and summed with the output of switch 8 by adder 6 to recover the original video sample for storage in one-frame delay memory 9.

Figure 9:
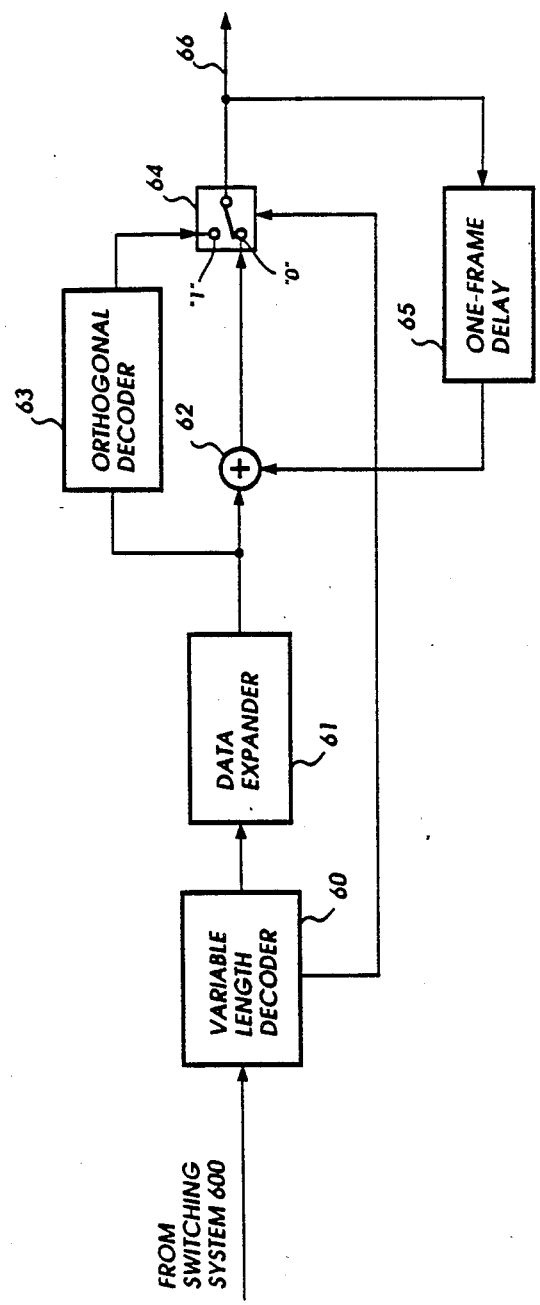
FIG. 9 is a block diagram of a second form of the dual-mode video decoder of the present invention.

As shown in FIG. 9, another form of the dual-mode video decoder 400 is shown which comprises a variable length decoder 60 and a data expander 61 both being identical to those shown at 30 and 31 in FIG. 6. The output of data expanded 61 is coupled to one input of an adder 62 and an orthogonal decoder 63. The output of adder 62 is coupled to the "0" position terminal of a switch 64 and the output of orthogonal decoder 54 is applied to the "1" position terminal of switch 64. Switch 64 is responsive to the switching control signal from variable length decoder 60 to selectively couple the signals applied to its terminals to a one-frame delay memory 65 as well as to an output line 66. The output of delay memory 65 is connected to the other input of adder 62. Orthogonal decoder 63 performs translation of a received frequency-domain signal to the original spatial-domain signal of differential value to reproduce a replica of original video samples, which is applied through switch 64 to the output line 66 as well as to the delay memory 65 when the interpixel signal is being received. On receipt of invalid data bits, the switch 55 is connected to the "0" position terminal to apply the output of adder 62 the delay memory 65, so that a sum of data read out of memory 65 and the received invalid data bits are applied to the output line 66 and, at the same time, stored into memory 65.

Figure 10:
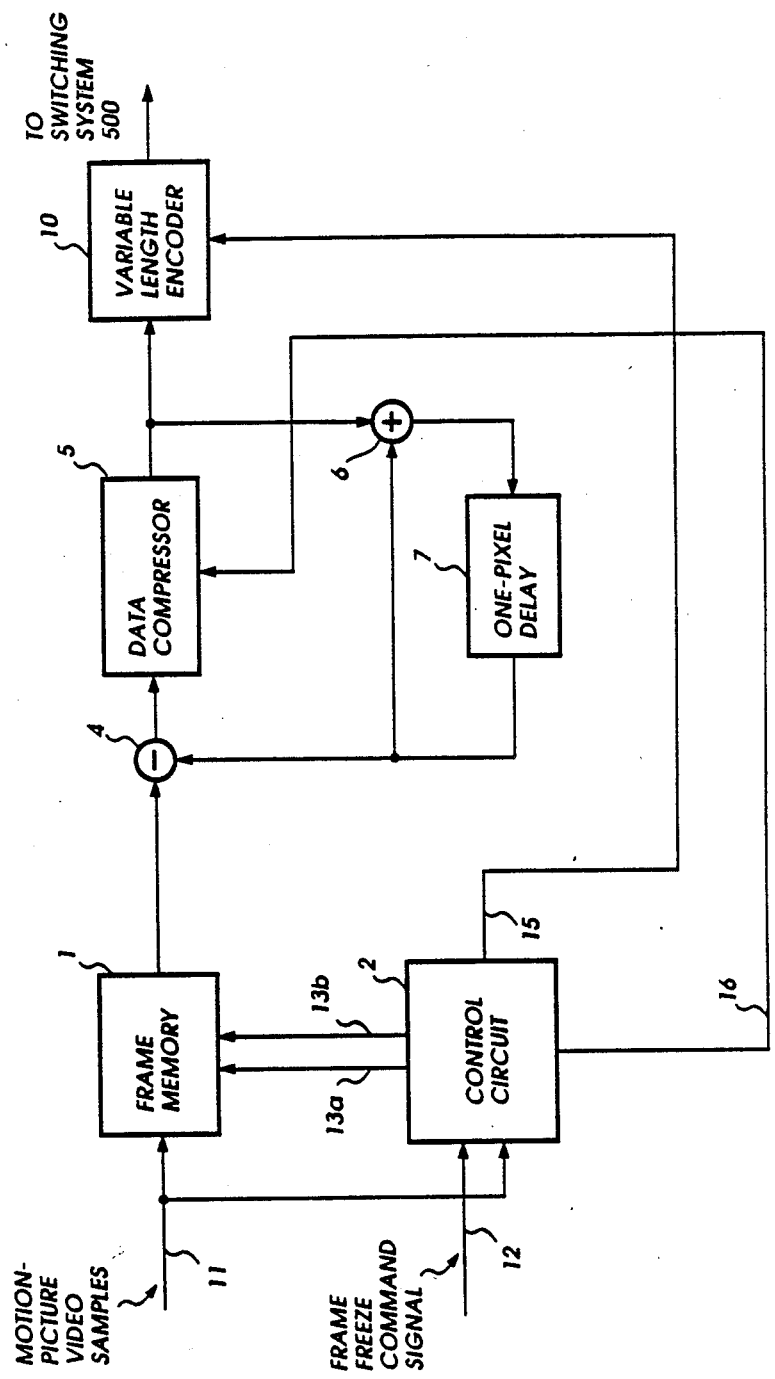
FIG. 10 is a block diagram of a first form of the still-picture video encoder of the present invention.

FIG. 10 is an illustration of one form of the still-picture video encoders 300. This video decoder is constructed from the video encoder of FIG. 2 by removing from it the one-frame delay memory 9 and switches 3 and 8 and directly connecting the outputs of frame memory 1 and one-pixel delay 7 to subtractor 4. With this configuration, one-pixel delay 7 produces differentially coded interpixel signals during the time the data compressor 5 is enabled in response to logic-0 input from line 16 and generates invalid data during the time the data compressor 5 is disabled in response to logic-1 input on line 16. The invalid data is combined with the input from frame memory 1 by the subtractor 4. The combined signal from the subtractor 4 is disregarded by data compressor 5 as the latter supplies invalid, "0" bit data to variable length encoder 10.

Figure 11:
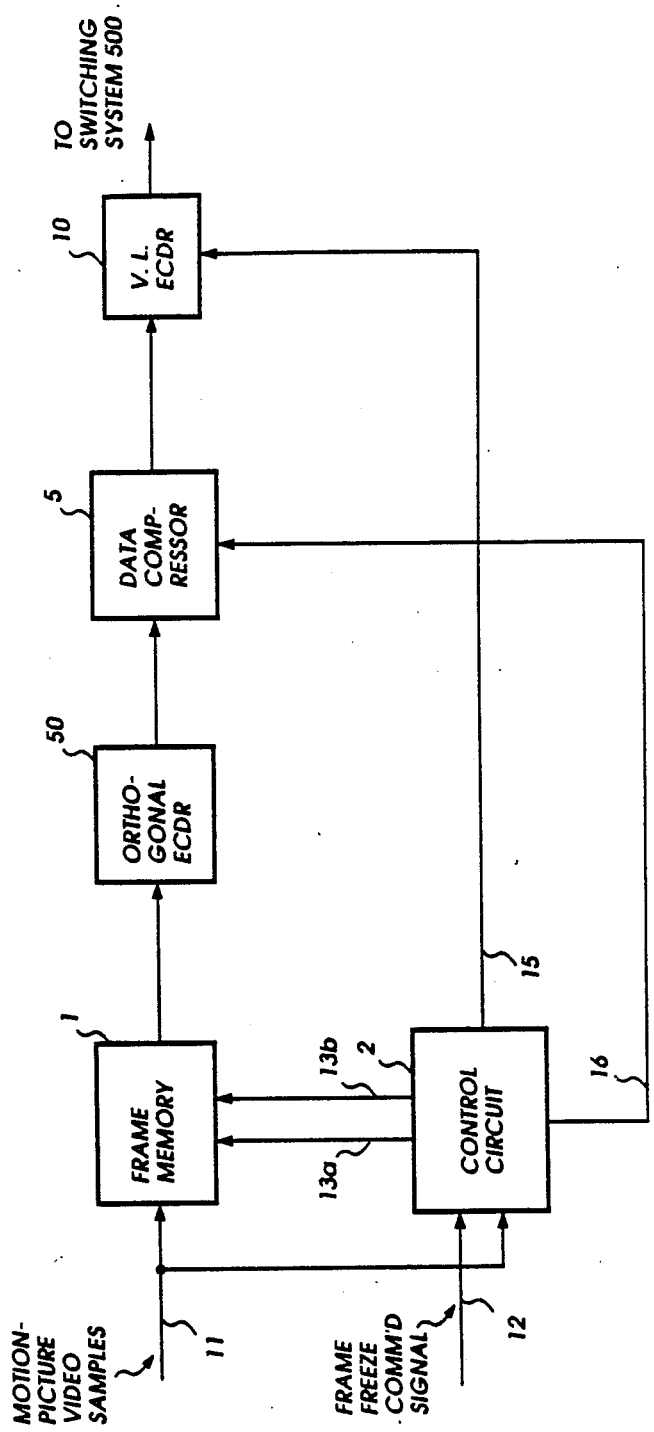
FIG. 11 is a block diagram of a second form of the still-picture video encoder of the present invention.

Another form of the still-picture video encoder is shown in FIG. 11 in which the encoder is constructed from the video encoder of FIG. 8 by removing from it the one-frame delay memory 9, switches 3 and 8, subtractor 4, adder 6 and orthogonal decoder 51 and directly connecting the output of frame memory 1 to orthogonal encoder 50. Orthogonal encoder 50 constantly produces an interpixel correlated signal of 8-bit word, which is converted to a 6-bit word signal when the data compressor 5 is enabled in response to logic-0 input from line 16 and is disregarded when data compressor 5 is disabled in response to logic-1 input from line 16 to produce invalid "0" bit data.

Figure 12:
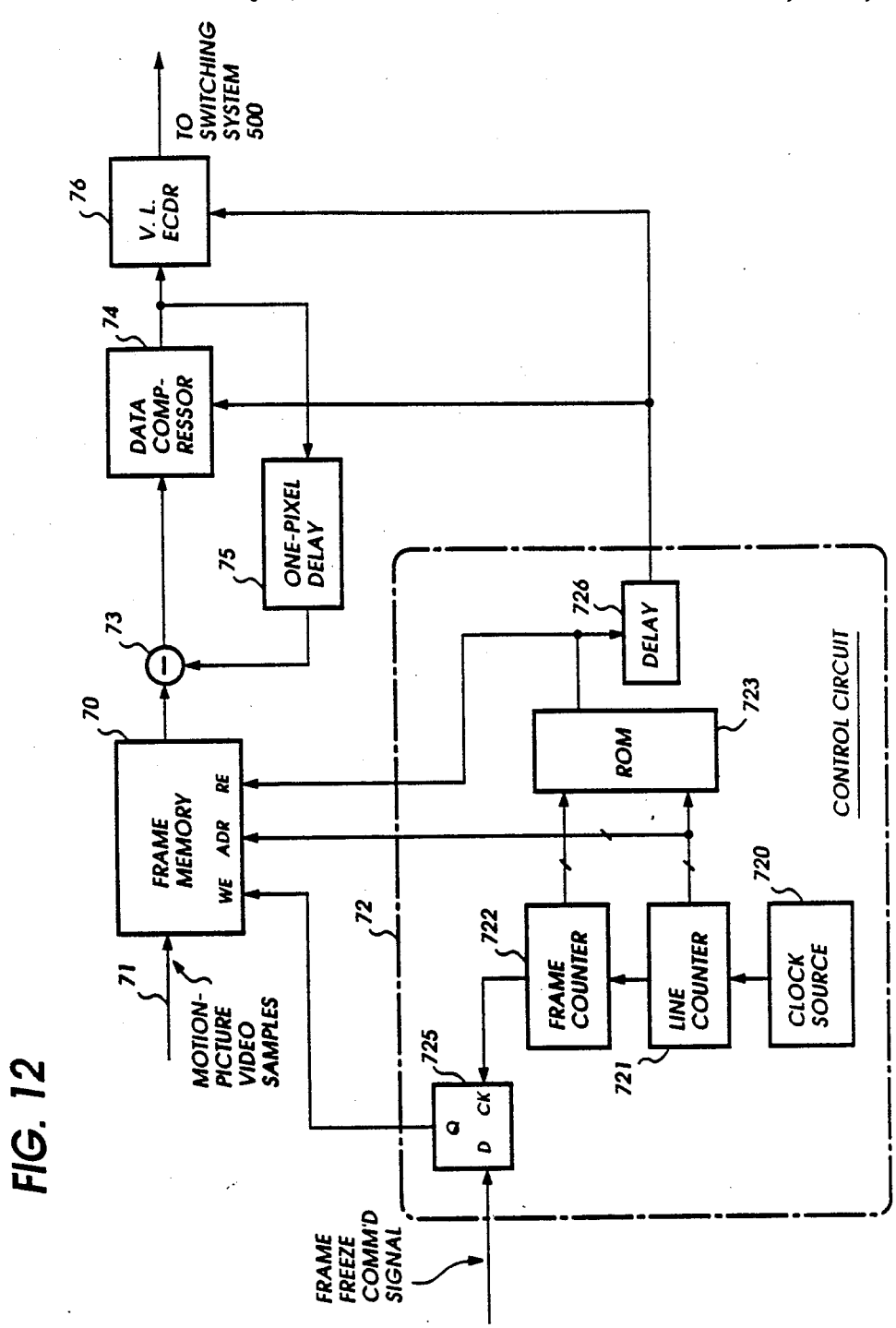
FIG. 12 is a block diagram of a third form of the still-picture video encoder of the present invention.

In FIG. 12, there is shown a further embodiment of the still-picture video encoder. In this embodiment, frame memory 70 has a write enable terminal (WE) connected to receive a write enable pulse from control circuit 72 to freeze a frame of motion-picture video samples supplied on input line 71, and an address terminal (ADR) through which it receives an address signal to read out samples from each successive line specified by an address signal from the control circuit 72 in the presence of a read enable pulse supplied through its read enable terminal (RE) from the control circuit 72. Control circuit 72 includes a line counter 721 which counts clock pulses from a clock source 720 to generate a binary address signal at line intervals as well as a carry pulse. This address signal is applied to a lower-significant input terminal of a read-only memory 723 and the carry pulse is applied to a frame counter 722. Frame counter 722 generates a binary address signal and a carry pulse at frame intervals. The binary address signal of the frame counter 722 is applied to a higher-significant address input of the ROM 723 and the carry pulse of frame counter 722 is applied to the clock input of a type D flip-flop 725 whose D input terminal receives frame freeze command signal. A pulse having exactly the duration of a frame is generated by the flip-flop 725 and applied to the write enable terminal of frame memory 70.

Read-only memory 723 has a plurality of memory planes. Each memory plane is accessed by the frame address signal supplied to its higher-significant address input input from frame counter 722 and stores a series of binary "1" is in locations which are successively accessed by the line address signal supplied to it lower-significant address input from line counter 721. For example, the first memory plane stores binary "1"s in locations which can be accessed when the line address input indicates the first to the tenth line of the frame stored in memory 70, and the second memory plane stores binary "1"s in locations which can be accessed when the line address input represents the eleventh to the twentieht line of the stored frame, and so on.

It can be seen that, by applying a series of binary "1"s from the ROM 723 as a read enable pulse and the line address input from line counter 721, video samples can be read out of locations corresponding to the first to the tenth line when frame address input of first occurrence is generated by frame counter 722 following the write-in operation of memory 70 and subsequently video samples can be read out of locations corresponding to the eleventh to the twentieth line when frame address input of second occurrance is generated by frame counter 722. Therefore, in a first frame interval, the initial ten lines (#1 to #10) are sequentially read out of memory 70 and supplied to a subtractor 73 and in a second frame interval the next ten lines (#11 to #20) are sequentially supplied to the subtractor 73. The control signal for data compressor 74 and variable length encoder 76 is a logic-1 pulse which is derived from the output of ROM 723 by appropriately delaying it by a delay circuit 726 so that the delayed binary "1"s coincide with the timing of video samples. In response to a logic-1 pulse from control circuit 72, data compressor 74 is enable to perform digit compression in a manner identical to that described in connection with FIG. 2 and, in response to a logic-0 input, it ceases digit compression and generates invalid, "0" bit data. Variable length encoder 76 performs high-efficiency coding in a manner identical to that described in connection with FIG. 2 and responds to the logic-1 input from the control circuit 72 by inserting a code to the output data bit stream indicating that the signal being sent is derived from interpixel coding (refresh mode) and responds to the logic-0 input from the control circuit by inserting to it a code indicating that the signal being sent is invalid data bits (non-refreshed mode). In this way, a plurality of successive scanning lines can be refreshed during each frame interval.

Figure 13:
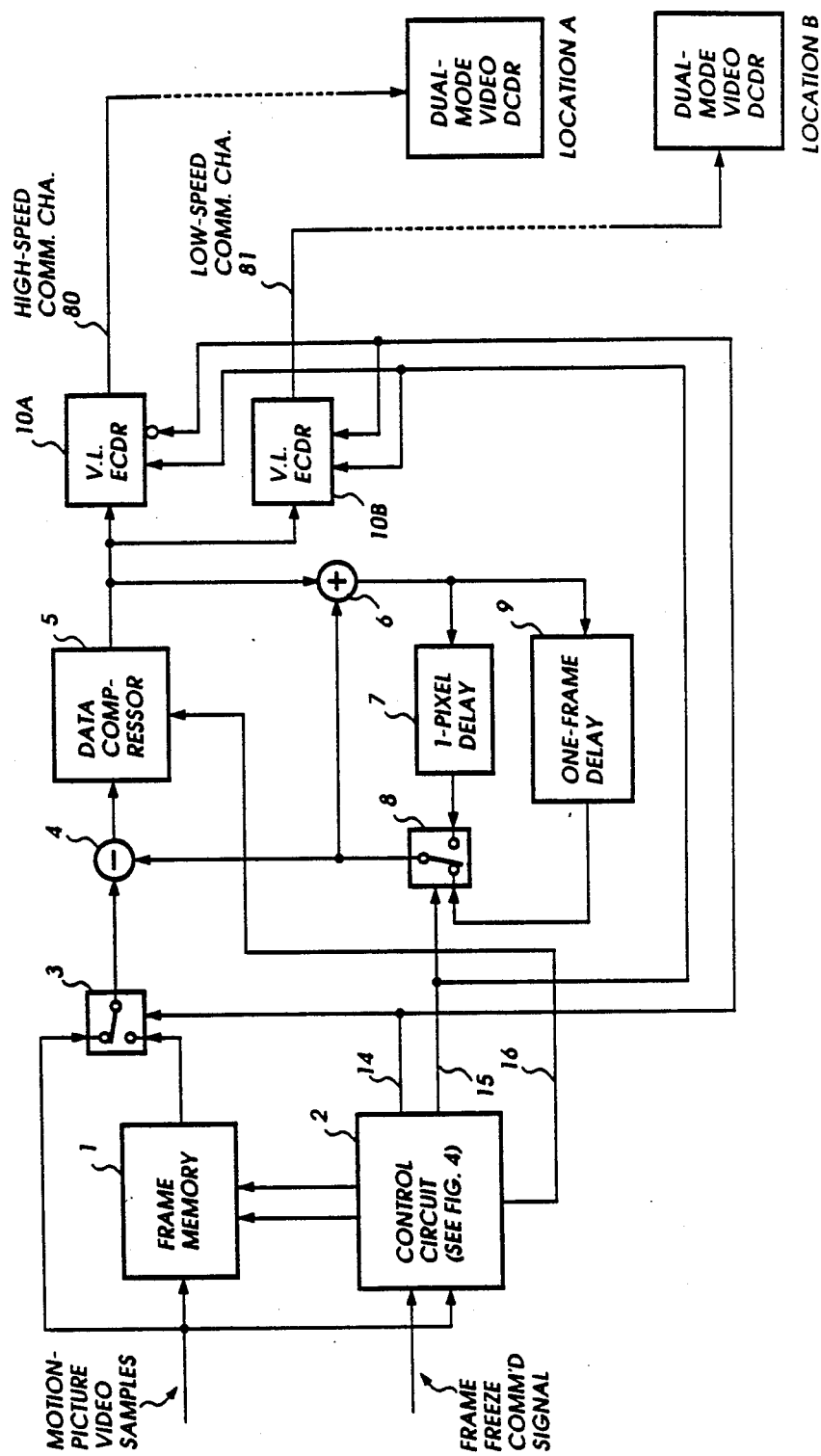
FIG. 13 is a block diagram of a third form of the dual-mode video encoder of the invention.

A further embodiment of the present invention is shown in FIG. 13. This embodiment differs from the FIG. 2 embodiment by the inclusion of two variable length encoders 10A and 10B which are coupled to the output of data compressor 5. Each of these encoders is responsive to the signal from control line 16 to insert signal identification codes as in the previous embodiment, but operates in mutually exclusively times in response to the mode select signal on control line 14. During motion-picture modes, control line 14 is at logic-0 and encoder 10A is enabled in response thereto, and in still-picture modes control line 14 is at logic-1 and encoder 10B is enabled. The outputs of encoders 10A and 10B are respectively connected through high-and low-speed communication channels 80 and 81 of a switched network to dual-mode video decoders at separate locations A and B. This configuration permits a transmitter station to establish simulataneous video communication paths with two destinations. For example, if motion-picture signal is initally transmitted to the video decoder at location A, and subsequently switched to still-picture transmission, the motion-picture frame of the last transmission can be stored in the frame memory of the location A for continued viewing and the decoder at location B receives the still-picture version of the last transmission of the motion-picture signals. In this way, the decoders at both destinations can receive the same image simultaneously. Further switching to motion-picture mode allows the location B to hold the still-picture frame in its frame memory for continued viewing and the decoder at location A to receive new motion-picture signals to update its frame memory.

The foregoing description shows only preferred embodiments of the present invention. Various modifications are apparent to those skilled in the art without departing from the scope of the present invention which is only limited by the appended claims. Therefore, the emobodiments shown and described are only illustrative, not restrictive.

What is claimed is:

1. A still-picture video encoder for a teleconferencing system, comprising:
   a frame memory;
   control means for writing video samples of a frame of
   a motion-picture signal into said frame memory and reading stored video samples at frame intervals from said frame memory; and encoder means for encoding video samples read out of a location of said frame memory corresponding to at least one scanning line period of said frame into a signal representative of an intraframe correlation between adjacent ones of said video samples and generating a signal of a constant value during remaining line periods of said frame, said location being successively shifted by at least one scanning line at said frame intervals.

2. A still-picture video encoder as claimed in claim 1, wherein said encoder means comprises:
  subtractor means having a first input terminal for receiving video samples read out of said frame memory and a second input terminal;
  adder means having a first input terminal responsive to an output signal from said subtractor means and a second input terminal; and
  delay means for delaying an output signal from said adder means for a period smaller than the period of said frame and applying the delayed signal to the second input terminals of said subtractor means and said adder means.

3. A still-picture video encoder as claimed in claim 1, wherein said encoder means comprises an orthogonal encoder for generating said intraframe correlation representative signal.

4. A still-picture video encoder as claimed in claim 1, wherein said control means comprises:
  means for periodically generating a line address signal representative of the location of each successive scanning line in said frame memory;
  means for periodically generating a frame address signal representative of the count of readout operations of said frame memory; and
  a memory having a plurality of memory areas each storing binary signals of a predetermined value, said memory areas being accessable as a function of said frame address signal and said stored binary signals being accessable as a function of said line address signal, said frame memory being accessable as function of said line address signal in the presence of said accessed binary signals.

5. A still-picture video encoder as claimed in claim 1, further comprising means for compressing a quantization range of an output signal of said encoder means to a range narrower than a quantization range of said video samples.

6. A still-picture video encoder as claimed in claim 5, further comprising means for generating a first code identifying said intraframe correlation representative signal and a second code identifying said constant value signal and combining said first and second codes with said intraframe correlation representative signal and said constant value signal into a data bit stream for transmission to a destination.

7. A still-picture video encoder as claimed in claim 5, wherein said compression means comprises a memory for storing data words represented by a smaller number of bits than a number of bits representing said video samples in said frame memory in locations addressable as a function of said intraframe correlation representative signal and generating said constant value signal during the remaining line periods of said frame.

8. A dual-mode video encoder for a teleconferencing system, comprising:
  a frame memory;
  encoder means; and
  control means for writing video samples of a frame of a motion-picture signal into said frame memory and reading stored video samples at frame intervals from said frame memory during a still-picture mode, and supplying said motion-picture signal to said encoder means during a motion-picture mode;
  said encoder means being operable during said still-picture mode for encoding video samples read out of a location of said memory corresponding to at least one scanning line period of said frame into a signal representative of an intraframe correlation between adjacent ones of said video samples and generating a signal of a constant value during remaining line periods of said frame and operable during said motion-picture mode for encoding video samples of said motion-picture signal for at least one scanning line period into a signal representative of said intraframe correlation and encoding video samples of said motion-picture signal for remaining line periods of each successive frame into a signal representative of an interframe correlation between successive frames, said location of the frame memory being successively shifted by at least one scanning line at frame intervals during said still-picture mode, and the video samples which are encoded into said interframe correlation representative signal being successively shifted by at least one scanning line at frame intervals during said motion-picture mode.

9. A dual-mode video encoder as claimed in claim 8, wherein said encoder means comprises:
  subtractor means having a first input terminal either responsive to video samples read out of said frame memory or video samples of said motion-picture signal, and a second input terminal;
  adder means having a first input terminal responsive to an output signal from said subtractor means and a second input terminal;
  first delay means for delaying an output signal from said adder means for a period smaller than a period of said frame;
  second delay means for delaying an output signal from said adder means for a period of said frame; and
  switch means for coupling the output of said first delay means to the second input terminals of said subtractor means and said adder means during said at least one scanning line period of either of said modes, and coupling the output of said second delay means to said second input terminals of said subtractor means and said adder means during the remaining line periods of either of said modes.

10. A dual-mode video encoder as claimed in claim 8, wherein said encoder means comprises:
  subtractor means having a first input terminal either responsive to video samples from said frame memory or video samples of said motion-picture signal, and a second input terminal;
  an orthogonal encoder connected to the output of said subtractor means;
  memory means for storing data words represented by a smaller number of bits than a number of bits representing said video samples in locations addressable as a function of an output signal from said orthogonal encoder and generating said constant value signal in response to ssid control means during said remaining line periods of said frame in said still-picture mode;
an orthogonal decoder connected to the output of said memory means;
adder means having a first input terminal responsive to an output signal from said orthogonal decoder and a second input terminal;
delay means for delaying an output signal from said adder means for a period of said frame; and
switch means responsive to said control means for applying a constant potential to the second input terminals of said subtractor means and said adder means during said at least one scanning line period of either of said modes, and coupling the output of said delay means to said second input terminals of said subtractor means and said adder means during the remaining line periods of either of said modes.

11. A dual-mode video encoder as claimed in claim 8, further comprising:
first encoder means operable during said motion-picture mode for generating a first code identifying said intraframe correlation representative signal and a second code identifying said interframe correlation representative signal and combining said first and second codes with said intraframe and interframe correlation representative signals into a data bit stream for transmission through a higher-speed communication channel to a first destination; and
second encoder means operable during said still-picture mode for generating a third code identifying said intraframe correlation representative signal and a fourth code identifying said constant value signal and combining said third and fourth codes with said intraframe correlation representative signal and said constant value signal into a data bit stream for transmission through a lower-speed communication channel to a second destination.

12. A dual-mode video encoder as claimed in claim 8, further comprising means for comprising a quantization range of an output signal of said encoder means to a range narrower than a quantization range of said samples.

13. A dual-mode video encoder as claimed in claim 12, further comprising means for generating a first code identifying said intraframe correlation representative signal during either of said modes and a second code identifying said constant value signal during still-picture mode or identifying said interframe correlation representative signal during said motion-picture mode, and combining said first and second codes with said intraframe correlation representative signal and said constant value signal into a data bit stream for transmission to a destination during said still-picture mode and combining said first and second codes with said intraframe and interframe correlation representative signals into a data bit stream for transmission during said motion-picture mode.

14. A dual-mode video encoder as claimed in claim 12, wherein said compression means comprises a memory for storing data words represented by a smaller number of bits than a number of bits representing said video samples in locations addressable as a function of said interframe correlation representative signal and generating said constant value signal in response to said control means during the remaining line periods of said frame.

15. A dual-mode video decoder for a teleconferencing system, comprising:
means for detecting from a received data bit stream a first code identifying a signal representative of an intraframe correlation between successive video samples during either of motion-picture and still-picture modes and a second code identifying a signal representative of an interframe correlation between successive frames during said motion-picture mode or identifying a signal having a constant value during said still-picture mode;
an adder;
a first delay loop operable during either of said modes and responsive to the detection of said first code by said detecting means for successively causing said adder to provide summation of successive ones of said intraframe correlation representative signal; and
a second delay loop operable during said motion-picture mode for delaying an output signal from said first delay loop and said interframe correlation representative signal for a period of said frame and responsive to the detection of said second code by said detecting means for causing said adder to provide summation of said delayed signals with the interframe correlation representative signal of a subsequent arrival, and further delaying the last-mentioned summed signals for a period of said frame to repeatedly cause said adder to provide summation of the further delayed signals with the interframe correlation representative signal of a later arrival, and operable during said still-picture mode for delaying the output signal from said first delay loop and said constant value signal for a period of said frame and responsive to the detection of said second code by said detecting means for causing said adder to provide summation of said delayed signals with the constant value signal of a subsequent arrival, and further delaying the last-mentioned summed signals for a period of said frame to repeatedly cause said adder to provide summation of the further delayed signals with the constant value signal of a later arrival.

16. A dual-mode video decoder as claimed in claim 15, wherein said adder has a first input terminal responsive to said received data bit stream containing said intraframe correlation representative signal, said interframe correlation representative signal and said constant value signal, and a second input terminal, said first and second delay loops including:
first delay means for delaying an output signal from said adder for a period smaller than a period of said frame;
second delay means for delaying the output signal of said adder for a period of said frame; and
switch means responsive to the detection of said first code for coupling the output of said first delay means to the second input terminal of said adder and reponsive to the detection of said second code for coupling the output of said second delay means to the second input terminal of said adder.

17. A dual-mode video decoder as claimed in claim 15, wherein adder has a first input terminal responsive to said received data bit stream containing said intraframe correlation representative signal, said interframe correlation representative signal and said constant value signal, and a second input terminal, said first and second delay loop comprising:

orthogonal decoder means for decoding said received data bit stream;

delay means for delaying a signal applied thereto for a period of said frame and applying the signal to the second input terminal of said adder; and switch means responsive to the detection of said first code for coupling the output of said orthogonal decoder means to said delay means and responsive to the detection of said second code for coupling the output of said adder to said delay means.

18. A teleconferencing system comprising:

a still-picture video encoder comprising:

a frame memory;

control means for writing video samples of a frame of a motion-picture signal into said frame memory and reading stored video samples at frame intervals from said frame memory; and encoder means for encoding video samples read out of a location of said frame memory corresponding to at least one scanning line period of said frame into a signal representative of an intraframe correlation between adjacent ones of said video samples and generating a signal of a constant value during remaining line periods of said frame, said location being successively shifted by at least one scanning line at frame intervals, and a video decoder for deriving a replica of original video samples from successive received versions of said intraframe correlation representative signal, delaying said replica for a period of said frame to derive a replica of original video samples from the delayed replica and a subsequently received version of said constant value signal, and further delaying the last-mentioned replica for a period of said frame to derive said replicas.

19. A teleconferencing system as claimed in claim 18, wherein said still-picture video encoder further comprises means for compressing a quantization range of an output signal from said encoder means to a range narrower than a quantization range of said video samples, and wherein said video decoder expands a quantization range of said intraframe correlation representative siganl to the quantization range of said video samples before said video samples are recovered from successive ones of said intraframe correlation representative signal.

20. A teleconnferencing system as claimed in claim 19, wherein said still-picture video encoder further comprises means for generating a first code identifying said intraframe correlation representative signal and a second code identifying said constant value signal and combining said first and second codes with said intraframe correlation representative signal and said constant value signal into a data bit stream, and wherein said video decoder comprises:

an adder;

a first delay loop responsive to the detection of said first code by said detecting means for successively causing said adder to provide summation of successive ones of said intraframe correlation representative signal; and a second delay loop for delaying the output signal from said first delay loop and said constant value signal for a period of said frame and responsive to the detection of said second code by said detecting means for causing said adder to provide summation of said delayed signals with the constant value signal of a subsequent arrival, and further delaying the last-mentioned summed signals for a period of said frame to repeatedly cause said adder to provide summation of the further delayed signals with the constant value signal of a later arrival.

21. A teleconferencing system comprising:

a dual-mode video encoder comprising:

a frame memory;

encoder means; and control means for writing video samples of a frame of a motion-picture signal into said frame memory and reading stored video samples at frame intervals from each successively shifted location of said frame memory during a still-picture mode, and supplying said motion-picture signal to said encoder means during a motion-picture mode;

said encoder means being operable during said still-picture mode for encoding video samples read out of said memory during at least one scanning line period of said frame into a signal representative of an intraframe correlation between adjacent ones of said video samples read out of said memory and generating a signal of a constant value during remaining line periods of said frame and applying said intraframe correlation representative signal and said constant value signal to a transmit end of a lower-speed communication channel, said encoder means being further operable during said motion-picture mode for encoding video samples of said motion-picture signal for at least one scanning line period into a signal representative of said intraframe correlation and encoding video samples of said motion-picture signal for remaining line periods of each successive frame into a signal representative of an interframe correlation between successive frames and applying said intraframe correlation representative signal and said interframe correlation representative signal to a transmit end of a higher-speed communication channel, and a dual-mode video decoder operable during said still-picture mode for recovering a first replica of original video samples from successive ones of said intraframe correlation representative signal received through said lower-speed communication channel and for successively delaying said first replica for a period of said frame, recovering a second replica of original video samples from the delayed first replica and the constant value signal subsequently received through said low-speed communication channel, and further delaying said second replica for a period of said frame, and operable during said motion-picture mode for recovering a third replica of original video samples from successive ones of said intraframe correlation signal received through said higher-speed communication channel and delaying the third replica for a period of said frame, recovering a fourth replica of original video samples from the delayed third replica and the interframe correlation representative signal subsequently received through said higher-speed communication channel, and further delaying said fourth replica for a period of said frame.

22. A teleconferencing system as claimed in claim 21, wherein said dual-mode video encoder further comprises means for compressing a quantization range of an output signal from said encoder means to a range narrower than quantization range of said video samples, and wherein said dual-mode video decoder expands a quantization range of said intraframe correlation representative signal to the quantization range of said video samples before said either of said first and third replicas are recovered.

23. A teleconferencing system as claimed in claim 22, wherein said dual-mode video encoder further comprises means for generating a first code identifying said intraframe correlation representative signal and a second code identifying said constant value signal and combining said first and second codes with said intraframe correlation representative signal and said constant value signal into a data bit stream, and wherein said dual-mode video decoder comprises:
 an adder;
 a first delay loop operable during either of said modes and responsive to the detection of said first code by said detecting means for successively causing said adder to provide summation of successive ones of said interframe correlation representative signal; and
 a second delay loop operable during said motion-picture mode for delaying an output signal from said first delay loop and said interframe correlation representative signal for a period of said frame and responsive to the detection of said second code by said detecting means for causing said adder to provide summation of said delayed signals with the interframe correlation representative signal of a subsequent arrival, and further delaying the last-mentioned summed signals for a period of said frame to repeatedly caused said adder to provide summation of the further delayed signals with the interframe correlation representative signal of a later arrival, and operable during said still-picture mode for delaying the output signal from said first delay loop and said constant value signal for a period of said frame and responsive to the detection of said second code by said detecting means for causing said adder to provide summation of said delayed signals with the constant value signal of a subsequent arrival, and further delaying the last-mentioned summed signals for a period of said frame to delaying the last-mentioned summed signals for a period of said frame to repeatedly cause said adder to provide summation of the further delayed signals with the constant value signal of a later arrival.

* * * * *